(12) United States Patent
Zsuponyo

(10) Patent No.: US 11,660,776 B2
(45) Date of Patent: May 30, 2023

(54) POWER SAW TOOL

(71) Applicant: Robert Bosch GmbH, Stuttgart (DE)

(72) Inventor: David Zsuponyo, Dedestapolcsany (HU)

(73) Assignee: Robert Bosch GmbH, Stuttgart (DE)

(*) Notice: Subject to any disclaimer, the term of this patent is extended or adjusted under 35 U.S.C. 154(b) by 174 days.

(21) Appl. No.: 16/899,387

(22) Filed: Jun. 11, 2020

(65) Prior Publication Data
US 2020/0398454 A1 Dec. 24, 2020

(30) Foreign Application Priority Data
Jun. 19, 2019 (DE) ..................... 10 2019 208 919.4

(51) Int. Cl.
*B27B 9/02* (2006.01)
*B23D 45/16* (2006.01)

(52) U.S. Cl.
CPC ............... *B27B 9/02* (2013.01); *B23D 45/16* (2013.01)

(58) Field of Classification Search
CPC ....... B27B 9/02; B23D 45/16; Y10T 403/599; Y10T 403/32541; Y10T 403/606
USPC ............................................. 30/75, 388, 377
See application file for complete search history.

(56) References Cited

U.S. PATENT DOCUMENTS

| | | | | |
|---|---|---|---|---|
| 1,806,528 A | * | 5/1931 | Fegley | B27B 9/02 30/377 |
| 4,353,165 A | * | 10/1982 | Albery | B27B 9/02 30/376 |
| 5,570,511 A | * | 11/1996 | Reich | B27B 9/02 30/376 |
| 8,181,559 B1 | * | 5/2012 | Ende | B27B 9/02 30/375 |
| 2014/0283396 A1 | * | 9/2014 | Sinzig | B27B 21/08 30/505 |
| 2015/0000142 A1 | * | 1/2015 | Bermes | B23D 59/002 30/293 |
| 2015/0158198 A1 | * | 6/2015 | Sinzig | B27B 9/02 30/505 |
| 2016/0151930 A1 | * | 6/2016 | Sinzig | B27B 9/02 116/230 |
| 2017/0326660 A1 | * | 11/2017 | Nakashima | B23D 45/16 |

FOREIGN PATENT DOCUMENTS

| | | |
|---|---|---|
| CN | 103752943 A | 4/2014 |
| DE | 40 23 101 A1 | 1/1992 |
| DE | 10 2011 086 337 A1 | 5/2013 |
| DE | 10 2012 213 383 A1 | 1/2014 |
| GB | 2 302 057 A | 1/1997 |
| JP | 2014-108557 A | 6/2014 |

* cited by examiner

*Primary Examiner* — Ghassem Alie
(74) *Attorney, Agent, or Firm* — Maginot, Moore & Beck LLP

(57) ABSTRACT

A power saw tool, in particular a hand-held circular saw, includes at least one cutting depth setting unit and at least one locking unit. The cutting depth setting unit is configured to set a cutting depth. The locking unit is configured to at least one of block and deactivate the cutting depth setting unit in at least one operating state. The locking unit is mounted so as to be at least partially movable on the cutting depth setting unit.

14 Claims, 5 Drawing Sheets

POWER SAW TOOL

This application claims priority under 35 U.S.C. § 119 to patent application no. DE 10 2019 208 919.4, filed on Jun. 19, 2019 in Germany, the disclosure of which is incorporated herein by reference in its entirety.

BACKGROUND

A power saw tool having at least one cutting depth setting unit which is provided for setting a cutting depth, and having at least one locking unit which is provided for blocking and/or for deactivating the cutting depth setting unit in at least one operating state, has already been proposed in DE 40 23 101 A1.

SUMMARY

The disclosure proceeds from a power saw tool, in particular a hand-held circular saw, having at least one cutting depth setting unit which is provided for setting a cutting depth, and having at least one locking unit which is provided for blocking and/or for deactivating the cutting depth setting unit in at least one operating state.

It is proposed that the locking unit is mounted so as to be at least partially movable on the cutting depth setting unit.

The locking unit is preferably disposed on the cutting depth setting unit, in particular fastened on the cutting depth setting unit. "The locking unit being at least partially movable on the cutting depth setting unit" is in particular to be understood that at least one component of the locking unit is mounted so as to be movable along and/or about a movement axis on at least one component of the cutting depth setting unit. The locking unit is preferably mounted on the cutting depth setting unit so as to be at least partially rotatable or pivotable about a rotation axis of the locking unit. However, it is also conceivable that the locking unit is mounted on the cutting depth setting unit so as to be movable along a translation axis of the locking unit. The cutting depth setting unit in an activation of a cutting depth setting element of the cutting depth setting unit by a user is preferably provided for setting the cutting depth and/or in an activation for enabling the cutting depth to be set by the user. The cutting depth setting element is preferably movable in and/or counter to an operating direction of the cutting depth setting unit.

The power saw tool preferably comprises at least one tool receptacle for connecting, in particular for connecting in a rotationally fixed manner, to a saw tool such as, for example, a circular saw blade. For setting the cutting depth, a housing unit of the power saw tool by way of the cutting depth setting unit is preferably mounted so as to be movable relative to a guide plate of the power saw tool. For setting the cutting depth, the tool receptacle, in particular conjointly with the housing unit, by way of the cutting depth setting unit, is preferably mounted so as to be movable relative to the guide plate. Particularly preferably, the tool receptacle has at least one movement axis.

The saw tool by way of a motor of the power saw tool and the tool receptacle is in particular able to be driven about the movement axis. The tool receptacle is preferably able to be driven by way of a motor of the power saw tool and provided for driving, in particular rotating, the saw tool at least partially about the movement axis. In particular, the tool receptacle and/or the housing unit by way of the cutting depth setting unit is able to be moved along one movement plane of the tool receptacle and/or of the housing unit. The movement axis is preferably aligned so as to be at least substantially perpendicular to the movement plane. "Substantially perpendicular" is in particular to be understood to be an alignment of a straight line or of a plane relative to a further straight line or a further plane, wherein the straight line or the plane and the further straight line or the further plane, in particular when viewed in a projection plane, enclose an angle of 90°, and the angle has a maximum deviation of in particular less than 8°, advantageously less than 5°, and particularly advantageously less than 2°. The cutting depth setting unit preferably has at least one bearing element which is provided for mounting at least the housing unit and/or the tool receptacle so as to be movable, in particular pivotable, on the guide plate. The guide plate by way of the cutting depth setting unit, in particular the bearing element of the cutting depth setting unit, is preferably disposed on the housing unit. In particular, the locking unit, preferably by way of the cutting depth setting element, is disposed on the housing unit and by way of the bearing element of the cutting depth setting unit mounted so as to be movable, in particular pivotable, preferably conjointly with the housing unit, on the guide plate. The cutting depth setting unit preferably has at least one rotation axis about which the at least one housing unit and/or the tool receptacle are/is pivotable relative to the guide plate. The guide plate preferably comprises at least one workpiece contact face which is particular disposed along a side of the guide plate that faces away from the housing unit. The workpiece contact face is preferably provided for bringing the power saw tool to bear on a surface of the workpiece so as to machine a workpiece, in particular by means of the saw tool. The workpiece contact face, in particular in at least one operating state of the power saw tool, in which the movement plane is disposed so as to be at least substantially perpendicular to the workpiece contact face, preferably at an alignment of the saw tool of 90° relative to the workpiece contact face, is aligned so as to be at least substantially parallel to the movement axis. "Substantially parallel" is in particular to be understood to be an alignment of a straight line or of a plane relative to a further straight line or a further plane, wherein the straight line or the plane and the further straight line or the further plane, in particular when viewed in a projection plane, have a deviation of in particular less than 8°, advantageously less than 5°, and particularly advantageously less than 2°. The rotation axis in the operating state of the power saw tool in which the movement plane is disposed so as to be at least substantially perpendicular to the workpiece contact face, preferably an alignment of the saw tool of 90° relative to the workpiece contact face, is aligned so as to be at least substantially parallel to the workpiece contact face. The bearing element of the cutting depth setting unit, when viewed transversely to the workpiece contact face of the guide plate, is preferably disposed on the guide plate in a peripheral region of the guide plate. For setting the cutting depth, the cutting depth setting unit, in particular in an activation of the cutting depth setting element by a user, is preferably provided for moving at least the tool receptacle relative to the guide plate of the power saw tool. The tool receptacle and the housing unit are preferably mechanically connected to one another, wherein a position of the movement axis relative to the housing unit is in particular fixed. The cutting depth as a maximum extent of the saw tool across the guide plate is in particular configured on a side of the guide plate that faces away from the housing unit. The cutting depth is preferably configured as a maximum spacing of an outermost edge and/or side of the saw tool, perpendicular to the workpiece contact face, from the guide plate. The cutting depth is preferably a function of the spacing of the tool receptacle from the workpiece bearing face, set by means of the cutting depth setting unit, and in particular of a maximum external diameter of the saw tool. In particular, the tool receptacle and/or the housing unit, by means of the cutting depth setting unit, in at least one non-activated operating state of the cutting depth setting element, are/is held and/or fixed in at least one cutting depth position relative to the guide plate. The cutting depth setting unit preferably has at least one blocking element which is provided for blocking and/or for preventing a movement of the tool receptacle and/or of the housing unit, in particular by way of the bearing element of the cutting depth setting unit, relative to the guide plate. The cutting depth setting unit in an activation of the cutting depth setting element is in particular provided for releasing the blocking element, wherein a movement of the tool receptacle and/or of the housing unit, in particular by way of the bearing element of the cutting depth setting unit, relative to the guide plate is released and/or enabled. For example, the blocking element is configured as a pin, as a bolt, as a tensioning means, or the like. The cutting depth setting unit preferably has at least one coupling element which is provided for connecting, particularly directly, preferably mechanically, the cutting depth setting element and the locking element, in particular for releasing the blocking element. For example, the coupling element is configured as a cable pull, as a Bowden cable, and/or as any other element which transmits a compression force or a tensile force. However, it is also conceivable for the coupling element to be configured as a part of an electronics system of the power saw tool, wherein, for example by activating the cutting depth setting element, an electric and/or electronic signal which, by way of the coupling element, causes an activation of an actuator which is provided for moving the blocking element, in particular for moving the latter to a releasing position, is generated.

The locking unit preferably has at least one locked operating state, in particular the previously mentioned operating state, and at least one unlocked operating state. In particular, the cutting depth setting element in the unlocked operating state of the locking unit is able to be moved in the operating direction. The locking unit in the locked operating state for blocking and/or deactivating the cutting depth setting unit preferably interacts with at least one component, in particular of the housing unit, of the power saw tool, said component being different from the cutting depth setting unit. When blocking and/or deactivating the cutting depth setting unit by means of the locking unit, at least one movement of the cutting depth setting unit, in particular of the cutting depth setting element, for setting the cutting depth is in particular blocked, and/or setting of the cutting depth by the cutting depth setting unit is deactivated. The cutting depth setting element in the locked operating state of the locking unit is preferably restricted in terms of a movement, in particular in the operating direction, and/or is fixed in a position relative to the housing unit.

It is conceivable for the power saw tool to comprise at least one cutting angle setting device. The cutting angle setting device, by activation by a user, is provided for setting at least one cutting angle of the power saw tool, wherein at least the tool receptacle is in particular movable about a tilting axis of the cutting angle setting device relative to the guide plate. The cutting angle setting device is preferably configured in such a manner that the tilting axis is aligned so as to be at least substantially parallel to the workpiece contact face and/or at least substantially perpendicular to the rotation axis. The cutting angle setting device is in particular configured in such a manner that the tilting axis runs so as to be at least substantially parallel to the workpiece contact face. The cutting angle setting device preferably comprises at least one bearing unit which is provided for moving at least the tool receptacle and/or the housing unit about the tilting axis, wherein in particular the movement axis and/or the movement plane are/is moved relative to the workpiece contact face and/or the rotation axis. The cutting angle setting device is preferably configured in such a manner that the tilting axis is aligned so as to be at least substantially perpendicular to the movement axis and/or at least substantially parallel to the movement plane. The bearing unit has in particular at least one guide element which is in particular configured so as to be curved, the tool receptacle being movable about the tilting axis along said guide element. At least the tool receptacle by way of at least one securing element of the cutting angle setting device is preferably able to be fixed in at least one position, preferably along the guide element. The securing element is configured, for example, as a screw, as a spring element, and/or a tensioning means of other configuration. However, other design embodiments of the cutting angle setting device are also conceivable.

An advantageously high level of operating comfort can be enabled when setting the cutting depth on account of the design embodiment of the power saw tool according to the disclosure. An advantageously high level of safety can be achieved when setting the cutting depth, in particular since any unintentional setting of the cutting depth when in operation can advantageously be avoided. An advantageously compact power saw tool can be enabled in particular on account of the locking unit being disposed on the cutting depth setting unit. Advantageously reliable locking of the cutting depth setting unit can be achieved, in particular since the locking unit interacts directly with the cutting depth setting unit.

It is furthermore proposed that the locking unit has at least one activating element and the cutting depth setting unit has at least one cutting depth setting element, in particular the previously mentioned cutting depth setting element, wherein the activating element is mounted so as to be movable on, in particular in the cutting depth setting element. The activating element in an activation by a user is preferably provided for unlocking the cutting depth setting unit, in particular the cutting depth setting element. In particular, the cutting depth setting element is at least largely enclosed by the housing unit. The locking unit preferably has at least one form-fitting and/or force-fitting element, in particular a mechanical detent, wherein the activating element for blocking and/or deactivating the cutting depth setting unit in at least one operating state is provided for interacting with the form-fitting and/or force-fitting element. The form-fitting and/or force-fitting element is preferably configured so as to be integral to the housing unit of the power saw tool. "Integral" is in particular to be understood to be connected at least in a materially integral manner, for example by a welding process, an adhesive bonding process, a molding process, and/or any other process which appears expedient to the person skilled in the art, and/or advantageously to be shaped in one piece, such as on account of being produced from one casting, for example, and/or on account of being produced by a single-component or multi-component injection molding method, and advantageously from one single blank. The form-fitting and/or force-fitting element is preferably disposed on an internal side of the housing unit. The activating element and/or the cutting depth setting element are/is in particular configured at least partially from a metal and/or a plastics material, in particular a hard plastics material. The locking unit and/or the cutting depth setting unit are/is preferably configured in such a manner that setting of the cutting depth takes place by way of a two-step method, wherein the activating element for unlocking the cutting depth setting unit is in particular moved relative to the cutting depth setting element and, in particular subsequently, the activating element and the cutting depth setting element for setting the cutting depth are conjointly moved relative to the housing unit. A high level of operating comfort when setting the cutting depth can be enabled. An advantageously compact power saw tool can be enabled in particular on account of the activating element being disposed on the cutting depth setting element. Advantageously reliable unlocking of the cutting depth setting element can be achieved, in particular since the locking unit interacts directly with the cutting depth setting unit.

It is moreover proposed that the activating element is mounted so as to be pivotable on, in particular in, the cutting depth setting element. The activating element is preferably mounted about a pivot axis of the activating element on the cutting depth setting element, wherein the pivot axis is in particular aligned so as to be at least substantially parallel to the movement axis of the tool receptacle. The activating element preferably has at least one bearing lug which is in particular aligned so as to be symmetrical to the pivot axis. The activating element is preferably configured in such a manner that the bearing lug of the activating element along the pivot axis runs across at least an entire transverse extent of the activating element. The bearing lug of the activating element is in particular configured across an entire transverse extent of the activating element. The locking unit preferably comprises at least one bearing element which is at least partially configured in the shape of a rod, pin, or bolt, for example. The bearing element of the locking unit is preferably provided for mounting the activating element so as to be pivotable on the cutting depth setting element. The bearing element of the locking unit is in particular disposed within the bearing lug of the activating element. The cutting depth setting element preferably delimits at least one lead through in which the bearing element of the locking unit is disposed. The bearing element of the locking unit, in particular on a side of the cutting depth setting element delimiting the lead through delimited by the cutting depth setting element, is connected in a rotationally fixed manner to the cutting depth setting element. The pivot axis and/or the bearing element of the locking unit, when viewed in the movement plane and/or along the movement axis, are/is preferably disposed within the housing unit. The bearing element of the locking unit is in particular configured from a metal and/or a plastics material, in particular a hard plastics material. An advantageously high level of operating comfort can be enabled. Setting of the cutting depth using one hand can advantageously be enabled. An advantageously compact design embodiment can be achieved.

It is furthermore proposed that the power saw tool comprises at least one, in particular the previously mentioned, housing unit which at least partially, in particular at least largely, encloses the locking unit and the cutting depth setting unit, wherein the activating element conjointly with the cutting depth setting element is mounted so as to be pivotable on the housing unit. The housing unit preferably comprises at least one bearing element which is configured, for example, as a bearing appendage or a bearing bolt, wherein the activating element conjointly with the cutting depth setting element is mounted so as to be pivotable, around an activation axis of the cutting depth setting unit, on the housing unit by way of the bearing element of the housing unit. The bearing element of the housing unit and/or the activation axis between two faces of an internal side of the housing unit extends/extends in particular so as to be at least substantially perpendicular to the movement plane and/or so as to be at least substantially parallel to the movement axis. The bearing element of the housing unit at least largely extends from one face of the internal side of the housing unit to a face of the internal side of the housing unit that is opposite said face. The bearing element of the housing unit is preferably disposed so as to be rotationally fixed on the housing unit, is in particular configured so as to be integral to the housing unit. The cutting depth setting element, at least in one region of the cutting depth setting element, preferably comprises at least one bearing lug for the pivotable mounting of the cutting depth setting element on the bearing element of the housing unit. The bearing lug of the cutting depth setting element is in particular disposed so as to be spaced apart from the activating element. The activating element on the cutting depth setting element is preferably disposed on an end region of the cutting depth setting element that faces away from the bearing lug of the cutting depth cutting element. The bearing lug of the cutting depth setting element is preferably disposed in an end region of the cutting depth setting element that is disposed within the housing unit. The activation axis is in particular configured as a central axis of the bearing lug of the cutting depth setting element. The housing unit preferably delimits at least one opening from an internal side to an external side of the housing unit, wherein the activating element and/or the cutting depth setting element are/is in particular disposed so as to be at least partially within the opening. In particular, the housing unit is at least partially configured from a metal and/or a plastics material, in particular a hard plastics material. An advantageously high level of operating comfort can be enabled. Setting of the cutting depth by one hand can advantageously be enabled. An advantageously compact power saw tool can be achieved.

It is furthermore proposed that the power saw tool comprises at least one, preferably the previously mentioned, operating unit, in particular the operating element for controlling a machine function, in particular of a motor, preferably of the previously mentioned motor, wherein the activating element and the cutting depth setting element are disposed in a region of proximity of at least one operating element of the operating unit. "A region of proximity" of a component, in particular of the operating element, is in particular to be understood to be a region, in particular a face on the housing unit, wherein the region has a maximum spacing from the component that is less than 25 cm, preferably less than 20 cm, and particularly preferably less than 15 cm, preferably viewed around the component. A further component, in particular the activating element and/or the cutting depth setting element which are/is disposed within the region of proximity are/is preferably able to be used and/or operated by one hand. The opening delimited by the housing unit is preferably disposed in the region of proximity of the operating element. The housing unit preferably delimits at least one further opening from the internal side to the external side of the housing unit, wherein the operating element is at least partially disposed within the further opening. The operating unit, in particular the operating element, is preferably disposed on a handle element of the housing unit. The activating direction of the operating unit, in particular of the operating element, is in particular aligned so as to be transverse, in particular so as to be at least substantially perpendicular, to the operating direction of the cutting depth setting unit, in particular of the cutting depth setting element. It is conceivable for the power saw tool to comprise at least one on-switch blocking unit which is in particular provided for at least temporarily blocking any activation of the operating element. The on-switch blocking unit preferably has at least one unblocking element for releasing the operating element. The unblocking element is in particular configured so as to be spring-loaded, wherein the unblocking element is impinged with a restoring force which is aligned in the direction of a blocked position of the unblocking element, in particular relative to the housing unit. The unblocking element for activating the operating element is preferably provided for being moved by a user to an unblocked position of the unblocking element, in particular relative to the housing unit, in particular to be continuously held in the blocked position. The unblocking element is particularly preferably disposed in the region of proximity of the operating element on the housing unit. The unblocking element preferably has at least one unblocking direction in which the unblocking element can be moved for releasing the operating element, in particular moved to the unblocked position. The on-switch blocking unit, in particular the unblocking element, is preferably configured in such a manner that the unblocking direction is aligned so as to be at least substantially perpendicular to the activating direction and/or to the operating direction. It is conceivable for the on-switch blocking unit to be configured so as to be coupled to the cutting depth setting unit, to the cutting angle setting device, and/or to the locking unit, wherein the unblocking element in an unblocked operating state of the locking unit and/or when setting the cutting depth by way of the cutting depth setting element is in particular held in the locked position. It is conceivable for the unblocking element to be connected, in particular mechanically, directly or indirectly to the activating element and/or to the cutting depth setting element. Operating the power tool machine by one hand, can be advantageously enabled in particular by way of the operating element, the activating element, and the cutting depth setting element.

It is moreover proposed that the cutting depth setting unit comprises at least one, in particular the previously mentioned, cutting depth setting element, and the locking unit comprises at least one, in particular the previously mentioned, activating element, wherein the cutting depth setting element delimits at least one recess, and wherein the activating element is at least partially disposed within the recess. The activating element is preferably at least largely disposed within the recess. The bearing element of the locking unit is preferably at least partially disposed in the recess delimited by the cutting depth setting element. In particular, the cutting depth setting element at least largely encloses the activating element and/or the bearing element of the locking unit. The pivot axis particularly preferably runs at least partially through the recess delimited by the cutting depth setting element. The cutting depth setting element is preferably configured in such a manner that the recess delimited by the cutting depth setting element extends transversely to the operating direction and completely from one side of the cutting depth setting element to a further side of the cutting depth setting element that faces away from said side. The activating element and the cutting depth setting element are in particular configured in such a manner that the cutting depth can in particular be set by one hand by way of a movement of the activating element in the unblocking direction and a preferably subsequent movement of the cutting depth setting element in the operating direction. It is conceivable for the cutting depth setting element to comprise at least one activation face and/or an activation appendage which in a position of the activating element corresponding to an unblocked operating state of the locking unit are/is in particular provided for operating the cutting depth setting element with one hand, in particular with one finger. The activation face and/or the activation appendage of the cutting depth setting element, in particular when viewed transversely to the operating direction, are/is preferably disposed in a region of the cutting depth setting element which encircles the recess delimited by the cutting depth setting element. The activation face is in particular disposed on a side of the cutting depth setting element that is disposed outside of the housing unit. The activating element preferably has at least one operating face which is disposed so as to be at least substantially parallel to the activation axis and/or the pivot axis. The operating face, in particular in at least one pivoted position of the activating element relative to the cutting depth setting element, is preferably disposed so as to be at least substantially parallel to the activation face. In particular, the operating face is at least partially disposed on a side of the activating element which, when viewed along the pivot axis, has a minimum spacing from the pivot axis which is equal to or larger than the activation face of the cutting depth setting element. The operating face is preferably disposed on a side of the activating element that is disposed outside the housing unit. An advantageously high level of operating comfort can be enabled. Setting of the cutting depth with one hand can advantageously be enabled. An advantageously compact power saw tool can be achieved.

It is furthermore proposed that the locking unit has at least one unlocking direction for unlocking the cutting depth setting unit, said unlocking direction being at least substantially directed counter to an operating direction, in particular the previously mentioned operating direction, of the cutting depth setting unit. The locking unit in an activation in particular of the activating element, in the unlocking direction by a user, is provided for unlocking, for activating the cutting depth setting unit, in particular the cutting depth setting element, and/or for cancelling a blocking action of the cutting depth setting element. In particular, the cutting depth setting unit in a movement in particular of the cutting depth setting element in the operating direction, in particular by way of the coupling element is provided for releasing the blocking element, in particular for setting the cutting depth or for switching setting of the cutting depth so as to be active. The cutting depth setting element in a blocked and/or deactivated operating state is preferably at least partially blocked against movement in the operating direction. The unlocking direction and the operating direction are preferably disposed so as to be at least substantially parallel to the movement plane and/or to at least one plane of the housing unit that comprises an axis of main extent of the handle element of the housing unit. An "axis of main extent" of a component, in particular of the handle element, is in particular to be understood to be an axis which runs parallel to a longest edge of a smallest geometric cuboid which just completely encloses the object. The axis of main extent of the handle element particularly preferably extends so as to be at least substantially parallel to the movement plane and/or so as to be at least substantially perpendicular to the movement axis. The unlocking direction and the operating direction are preferably aligned so as to be at least transverse to the activating direction of the operating unit, in particular of the operating element, of the power saw tool. The unlocking direction and the operating direction are preferably aligned so as to be at least substantially perpendicular to the movement axis. Any unintentional unlocking and setting of the cutting depth in an operation of the power saw tool can advantageously be avoided. An advantageously high level of operating comfort can be enabled since the activating element and the cutting depth setting element can be activated along one axis.

It is furthermore provided that the locking unit has at least one, in particular the previously mentioned, activating element and at least one restoring element which by way of a restoring force is provided for holding the activating element in a locked position, wherein the restoring element is at least partially, in particularly directly, supported by way of a cutting depth setting element, in particular the previously mentioned cutting depth setting element, of the cutting depth setting unit. The restoring element is preferably disposed at least partially between the activating element and the cutting depth setting element. The restoring element by one end is preferably supported on the cutting depth setting element, and by way of another end is supported on the activating element. The restoring element between the activating element and the cutting depth setting element extends so as to be at least substantially parallel to the operating direction, to the unlocking direction and/or to the movement plane. The restoring element is configured, for example, as a spring element, as an elastomer, as a hydraulic element, as a pneumatic element, or the like. The restoring element is in particular configured as a compression spring element or as a tension spring element. The restoring element, in particular in a design embodiment as a compression spring element, preferably is supported on a side of the activating element that is at least partially disposed in the unlocking direction. The restoring element is preferably configured and/or disposed in such a manner that the restoring force acts, in particular automatically, counter to an activating force of a user that is exerted on the activating element. The restoring element is in particular configured and/or disposed in such a manner that the restoring force acts in a direction counter to the unlocking direction. The restoring element is preferably at least largely, in particular at least substantially completely, disposed within the recess delimited by the cutting depth setting element. The restoring element is in particular at least largely enclosed by the cutting depth setting element and/or the activating element. It is conceivable for the restoring element by way of at least one end to be fastened to the cutting depth setting element and/or the activating element. Alternatively or additionally, it is conceivable for the restoring element by way of at least one end, in particular an end opposite said end, to be disposed so as to be guided on the activating element and/or the cutting depth setting element, in particular within a recess delimited by the activating element and/or the cutting depth setting element. An advantageously high level of safety can be achieved, in particular since the locking unit can be moved automatically back to a locked operating state. Any unintentional setting of the cutting depth can be avoided on account thereof.

It is moreover proposed that the power saw tool comprises at least one, in particular the previously mentioned, housing unit, wherein the locking unit and the cutting depth setting unit are at least partially disposed on a side that faces away from an operating element and from a machining region, in particular on a handle element, preferably the previously mentioned handle element, of the housing unit. The activating element and the cutting depth setting element, when viewed at least substantially perpendicularly to an axis of main extent of the handle element, are preferably disposed so as to be offset to the operating element of the operating unit, said operating element being in particular disposed on the handle element. The machining region is particularly preferably disposed on a side of the guide plate, in particular the tool contact face, that faces away from the locking unit, the cutting depth setting unit and/or the housing unit. The machining region is in particular disposed on the guide plate, in particular on the tool contact face. An advantageously high level of user comfort of the power saw tool can be achieved. Operating the power saw tool with one hand can advantageously be enabled. An advantageously high level of safety when setting the cutting depth can be enabled in particular since the activating element and the cutting depth setting element are disposed so as to be spaced apart from the machining region.

It is furthermore proposed that the unlocking unit comprises at least one electronics unit which in an activation by a user, is provided for releasing and/or activating the cutting depth setting unit in particular by way of an electric and/or electronic signal. It is conceivable for the electronics unit to be configured as a part of the electronics system of the power saw tool. It is conceivable for the locking unit, in particular the electronics unit, to be configured in such a manner that an unlocking of the cutting depth setting unit takes place by way of the locking unit, in particular so as to be independent of any impingement with force by a user, by way of a user identification such as, for example, a user-specific chip, a fingerprint scan, or the like, or an external unit, for example a central control unit or a server. The electronics unit is in particular configured as an electronic circuit, for example, which is supplied by way of a current source and/or a voltage source such as, for example, a mains connection or a rechargeable battery pack of the power saw tool. It is conceivable for the electronics unit to comprise at least one interface, in particular a data interface, which is in particular provided for receiving electric and/or electronic signals from the external unit and/or to transmit said electric and/or electronic signals to the external unit. It is conceivable for the activating element to be configured as a part, for example as a sensor, in particular a fingerprint sensor, a physical contact sensor, or the like, or as the interface, of the electronics unit. In particular in a design embodiment of the electronics unit in which the activating element is configured as a sensor, the activating element is preferably disposed on the cutting depth setting element, in particular on an activation face of the cutting depth setting element. The electronics unit preferably comprises at least one actuator which, in particular for unlocking and/or releasing the cutting depth setting unit, is provided for moving at least the form-fitting and/or force-fitting element of the locking unit relative to the cutting depth setting unit, in particular to the cutting depth setting element. The actuator is configured, for example, as a pneumatic element, hydraulic element, as a linear motor, or the like. In particular, the form-fitting and/or force-fitting element is preferably mounted by way of the actuator, so as to be at least partially movable on the cutting depth setting unit, in particular the cutting depth setting element. The form-fitting and/or force-fitting element is preferably able to be activated and/or activatable by the electric and/or electronic signal, in particular by way of the actuator. The form-fitting and/or force-fitting element, in particular by way of a form-fitting and/or force-fitting connection to the housing unit, is preferably provided for blocking and/or for deactivating the cutting depth setting unit, in particular the cutting depth setting element, in at least one deactivated operating state of the electronics unit. In particular in one design embodiment of the power saw tool in which the locking unit comprises the electronics unit, it is conceivable for the activating element to be at least substantially completely disposed within the housing unit and/or the cutting depth setting unit. In particular, the form-fitting and/or force-fitting element in a transition from an unlocked operating state to a locked operating state of the locking unit is provided for being moved relative to the cutting depth setting element by means of the actuator, wherein the form-fitting and/or force-fitting element for blocking and/or deactivating the cutting depth setting unit is brought in contact with the housing unit. Alternatively, in particular in one design embodiment of the restoring element as a hydraulic element, as a pneumatic element or the like, it is conceivable for the electronics unit to be provided for adapting the restoring force of the restoring element so as to activate and/or release the cutting depth setting unit, wherein the activating element is in particular configured so as to be independent of the electronics unit. The electronics unit is preferably controlled in an open-loop and/or closed-loop manner by way of the electric and/or electronic signal, such as by signals of a sensor element or an interface of the electronics unit, for example. For example, the restoring force in a locked operating state of the electronics unit is set, in particular by means of the electronics unit, such that the restoring force exceeds a force that can be applied by a user. The electronics unit in a transition from a locked operating state to an unlocked operating state, in particular on account of an activation by a user, is in particular provided for reducing the restoring force of the restoring element such that the activating element can be moved by a user. An advantageously high level of safety can be enabled, since any unintentional setting of the cutting depth can advantageously be avoided. Unauthorized use of the machine tool can advantageously be avoided, in particular since the electric and/or electronic signal for setting the cutting depth may be required. An advantageously compact power saw tool, in particular a locking unit, can be achieved. An advantageously high level of operating comfort can be enabled, in particular since an impingement with force of the cutting depth setting element may only be required for setting the cutting depth.

The power saw tool according to the disclosure herein is not to be limited to the application and embodiment described above. In particular, the power saw tool according to the disclosure for fulfilling a functionality described herein can have a number of individual elements, components and units which deviates from the number mentioned herein. Moreover, with the ranges of values specified in this disclosure, values lying within the specified limits are also to be considered disclosed and usable as desired.

BRIEF DESCRIPTION OF THE DRAWINGS

Further advantages are derived from the following description of the drawings. Three exemplary embodiments of the disclosure are illustrated in the drawings. The drawings, the description, and the claims contain numerous features in combination.

The person skilled in the art will expediently also consider the features individually and combine said features so as to form expedient further combinations.

In the drawings.

DETAILED DESCRIPTION

Figure 1:
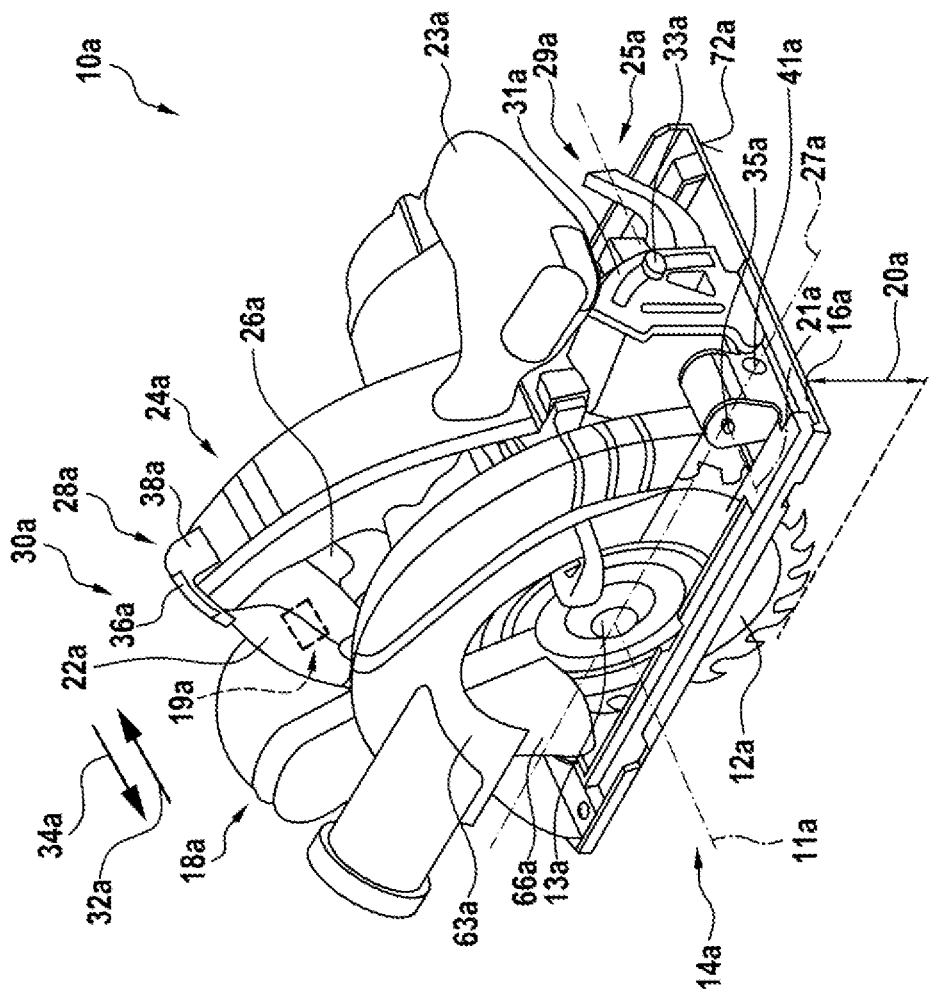
FIG. 1 shows a schematic illustration of a power saw tool according to the disclosure.

A power saw tool 10a configured as a hand-held circular saw is shown in FIG. 1. The power saw tool 10a comprises a tool receptacle 13a which is able to be connected, in particular in a rotationally fixed manner, to a saw tool 12a configured as a circular saw blade. However, other design embodiments of the power saw tool 10a, in particular as a circular plunge saw, are also conceivable. The power saw tool 10a has a guide plate 16a which comprises at least one workpiece contact face 72a. The power saw tool 10a comprises a housing unit 18a which encloses at least one motor and an electronics system 19a of the power saw tool 10a. The power saw tool 10a has a machining region 14a which is disposed on a side of the guide plate 16a, in particular of the workpiece contact face 72a, that faces away from the housing 18a. The power saw tool 10a has a protective boot 63a which at least partially encloses the saw tool 12a, in particular at an end of the saw tool 12a that faces the housing unit 18a. The saw tool has a cover 66a which is disposed so as to be movable on the protective hood 63a. The cover 66a is in particular able to be moved over the saw tool 12a into the machining region 14a, wherein the cover 66a at least partially encloses the saw tool 12a, in particular the cutting edge of the saw tool 12a. The guide plate 16a is disposed so as to be movable on the housing unit 18a. The cutting depth 20a is configured as a maximum extent of the saw tool 12a which, proceeding from the workpiece contact face 72a, is directed in a direction which is at least substantially perpendicular to the workpiece contact face 72a. The power saw tool 10a for controlling a machine function, in particular of the motor, has an operating unit 24a which comprises an operating element 26a configured as a pushbutton. The tool receptacle 13a has at least one movement axis 11a. The tool receptacle 13a can be driven by way of the motor of the power saw tool 10a and is provided for rotating the saw tool 12a about the movement axis 11a.

The power saw tool 10a comprises a cutting depth setting unit 28a which is provided for setting the cutting depth 20a, and a locking unit 30a which is provided for blocking and/or for deactivating the cutting depth setting unit 28a in at least one operating state. The locking unit 30a is mounted so as to be at least partially movable on the cutting depth setting unit 28a. The power saw tool 10a for setting the cutting depth 20a in at least one operating state is preferably provided for moving the tool receptacle 13a by way of the cutting depth setting unit 28a relative to the housing unit 18a of the power saw tool 10a. The locking unit 30a for unlocking the cutting depth setting unit 28a has at least one unlocking direction 32a which is at least substantially directed counter to an operating direction 34a of the cutting depth setting unit 28a. The locking unit 30a in an activation, in particular of an activating element 36a of the locking unit 30a, in the unlocking direction 32a by a user, is provided for unlocking, for activating the cutting depth setting unit 28a, in particular a cutting depth setting element 38a of the cutting depth setting unit 28a, and/or for cancelling a blocking action of the cutting depth setting element 38a. The locking unit 30a in a movement in particular of the cutting depth setting element 38a in the operating direction 34a is provided for setting the cutting depth 20a and/or for switching setting of the cutting depth 20a so as to be active. The cutting depth setting element 38a in a blocked and/or deactivated operating state by way of the locking unit 30a is at least partially blocked in relation to any movement in the operating direction 34a. The unlocking direction 32a and the operating direction 34a are aligned in a plane which comprises an axis of main extent of the handle element 22a. The unlocking direction 32a and the operating direction 34a are aligned so as to be transverse to an activating direction 40a of the operating unit 24a, in particular of the operating element 26a of the power saw tool 10a. The locking unit 30a and the cutting depth setting unit 28a are at least partially disposed on a side of the housing unit 18a that faces away from the operating element 26a and from the tool receptacle 13a. The locking unit 30a has at least one locked operating state and at least one unlocked operating state. However, other design embodiments of the cutting depth setting unit 28a and/or of the locking unit 30a, in particular in terms of an arrangement, the operating direction 34a and/or the unlocking direction 32a, are also conceivable.

For setting the cutting depth 20a, the housing unit 18a and the tool receptacle 13a of the power saw tool 10a are mounted so as to be able to be moved relative to the guide plate 16a of the power saw tool 10a by way of the cutting depth setting unit 28a. The cutting depth setting unit 28a has a bearing element 35a which is provided for mounting at least the housing unit 18a and the tool receptacle 13a so as to be pivotable on the guide plate 16a. The cutting depth setting unit 28a has a rotation axis 21a about which the cutting depth setting unit 28a, the locking unit 30a, the housing unit 18a, and the tool receptacle 13a are pivotable relative to the guide plate 16a. The rotation axis 21a in an alignment of the saw tool 12a of 90° relative to the workpiece contact face 11a is disposed so as to be at least substantially parallel to the movement axis 11a. The rotation axis 21a in an alignment of the saw tool 12a of 90° relative to the workpiece contact face 11a is disposed so as to be at least substantially parallel to the workpiece contact face 72a. The tool receptacle 13a and the housing unit 18a by way of the bearing element 35a of the cutting depth setting unit 28a are able to be moved along a movement plane of the tool receptacle 13a and of the housing unit 18a. In particular, the movement axis 11a is aligned so as to be at least substantially perpendicular to the movement plane. The bearing element 35a of the cutting depth setting unit 28a, when viewed transversely to the workpiece contact face 72a, is disposed on the guide plate 16a in a peripheral region of the guide plate 16a. The guide plate 16a by way of the cutting depth setting unit 28a, in particular the bearing element 35a of the cutting depth setting unit 28a, is disposed on the housing unit 18a. The locking unit 30a by way of the cutting depth setting element 38a is disposed on the housing unit 18a and, conjointly with the housing unit 18a, is mounted so as to be pivotable on the guide plate 16a by way of the bearing element 35a of the cutting depth setting unit 28aa. The cutting depth setting unit 28a, in particular in an activation of the cutting depth setting element 38a by a user, is provided for releasing at least the tool receptacle 13a for moving relative to the guide plate 16a of the power saw tool 10a, in particular for the cutting depth 20a to be set. The tool receptacle 13a and the housing unit 18a are mechanically connected to one another, in particular by screw connections. The cutting depth setting unit 28a has a blocking element which is provided for blocking and/or for preventing a movement of the tool receptacle 13a and of the housing unit 18a relative to the guide plate 16a, in particular by way of the bearing element 35a of the cutting depth setting unit 28a. The blocking element is in particular not shown in FIG. 1. The cutting depth setting unit 28a in an activation of the cutting depth setting element 38a is provided for releasing the blocking element, wherein a movement of the tool receptacle 13a and of the housing unit 18a relative to the guide plate 16a, in particular by way of the bearing element 35a of the cutting depth setting unit 28a, is released and/or enabled. The blocking element is configured as a bolt. However, other design embodiments of the bearing element 35a of the cutting depth setting unit 28a and of the blocking element are also conceivable. The cutting depth setting unit 28a has a coupling element 39a (not shown in FIG. 1) which is provided for mechanically connecting the cutting depth setting element 38a and the blocking element so as to release the blocking element. The coupling element 39a is configured as a Bowden cable. However, other design embodiments of the coupling element 39a, in particular as another transmission element for a tensile force or a compression force, are also conceivable.

The housing unit 18a is largely configured from a plastics material, in particular a hard plastics material. The housing unit 18a comprises a handle element 22a. The handle element 22a, proceeding from a side of the guide plate 16a that faces away from the machining region 14a, extends in a direction facing away from the guide plate 16a. The axis of main extent of the handle element 22a extends so as to be at least substantially parallel to the movement plane and so as to be at least substantially perpendicular to the movement axis 11a. The housing unit 18a comprises a further handle element 23a which is disposed on a side of the housing unit 18a that faces away from the handle element 22a. The further handle element 23a at least largely extends in a direction which is aligned so as to be at least substantially perpendicular to an axis of main extent of the handle element 22a. The operating unit 24a, in particular the operating element 26a, is disposed on the handle element 22a of the housing unit 18a. The locking unit 30a and the cutting depth setting unit 28a are at least partially disposed on a side of the handle element 22a that faces away from an operating element 26a and from a machining region 14a. However, other design embodiments of the housing unit 18a are also conceivable.

The power saw tool 10a has a cutting angle setting device 25a which on account of an activation by a user is provided for setting a cutting angle of the power saw tool 10a, in particular of the saw tool 12a, wherein in particular at least the tool receptacle 13a is movable relative to the guide plate 16a about a tilting axis 27a of the cutting angle setting device 25a. The cutting angle setting device 25a is configured in such a manner that the tilting axis 27a is aligned so as to be at least substantially parallel to the workpiece contact face 72a and so as to be at least substantially perpendicular to the rotation axis 21a. The cutting angle setting device 25a is configured in such a manner that the tilting axis 27a runs so as to be at least substantially parallel to the movement plane. The cutting angle setting device 25a comprises a bearing unit 29a which is provided for moving the tool receptacle 13a and at least partially the housing unit 18a about the tilting axis 27a. The bearing unit 29a of the cutting angle setting device 25a comprises a bearing element 41a which is configured as a bolt and on which the tool receptacle 13a and the housing unit 18a are movably mounted. The bearing unit 29a has at least one guide element 31a of a curved configuration, at least the tool receptacle 13a and the housing unit 18a being movable about the tilting axis 27a along said guide element 31a. At least the tool receptacle 13a and the housing unit 18a by way of a securing element 33a of the cutting angle setting device 25a are able to be fixed in at least one position relative to the guide plate 16a along the guide element 31a. The securing element 33a is configured as a screw. However, other design embodiments of the cutting angle setting device 25a, in particular of the guide element 31a and/or of the securing element 33a, are also conceivable.

Figure 2:
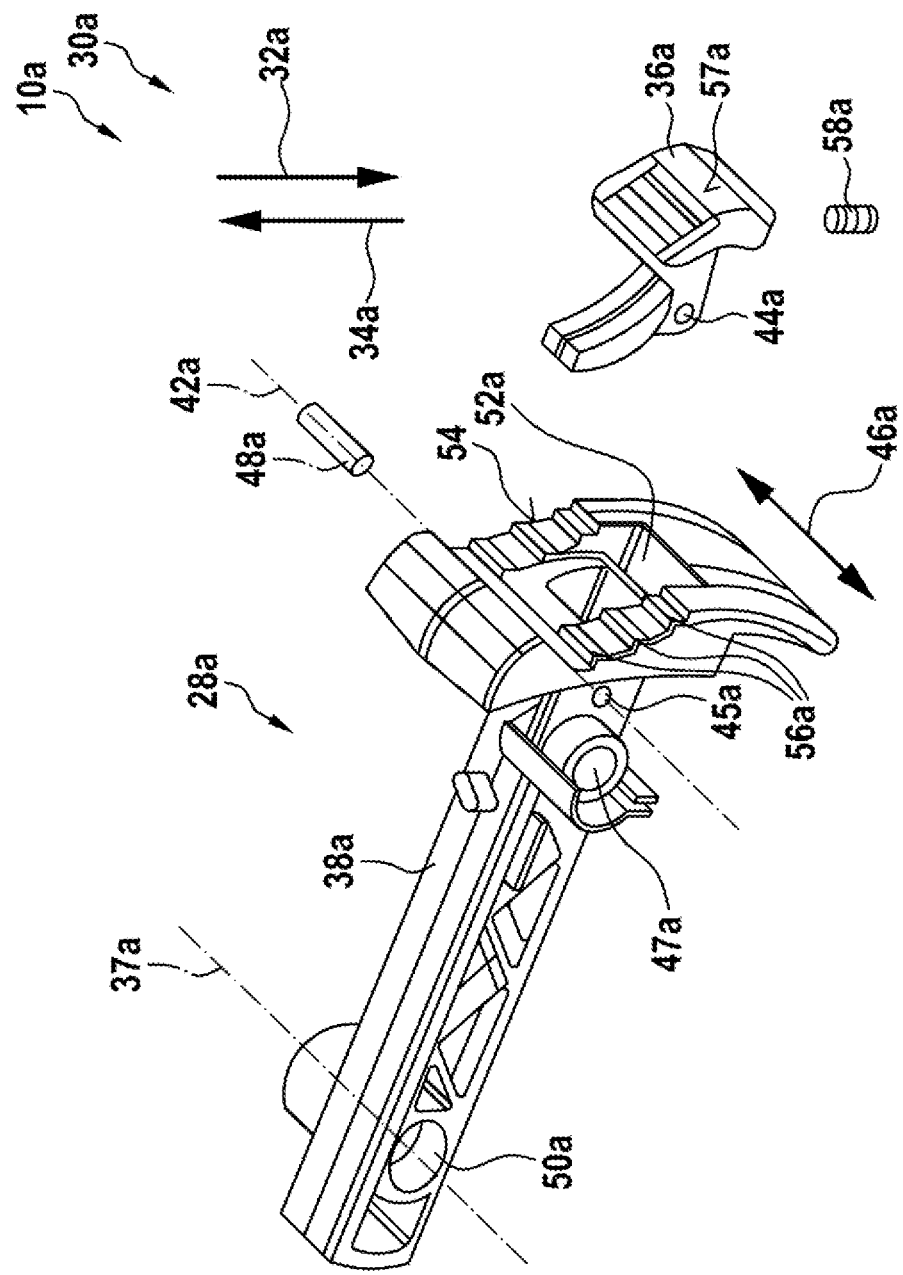
FIG. 2 shows a schematic illustration of an exploded drawing of a cutting depth setting unit and of a locking unit of the power saw tool according to the disclosure.

An exploded drawing of the cutting depth setting unit 28a and of the locking unit 30a is shown in FIG. 2. The activating element 36a is mounted so as to be movable on, in particular in, the cutting depth setting element 38a. The activating element 36a in an activation by a user is provided for unlocking the cutting depth setting unit 28a, in particular the cutting depth setting element 38a. The activating element 36a is mounted so as to be pivotable on, in particular in, the cutting depth setting element 38a. The activating element 36a is mounted on the cutting depth setting element 38a so as to be pivotable about a pivot axis 42a. The pivot axis 42a is aligned so as to be at least substantially perpendicular to the movement plane and so as to be at least substantially parallel to the movement axis 11a. The activating element 36a has a bearing lug 44a which is aligned so as to be symmetrical to the pivot axis 42a. The cutting depth setting element 38a delimits a lead through 45a which extend through the cutting depth setting element 38a so as to be at least substantially parallel to the pivot axis 42a. The lead through 45a delimited by the cutting depth setting element 38a is configured across at least an entire transverse extent 46a of the cutting depth setting element 38a. The locking unit 30a comprises a bearing element 48a which is configured in the shape of a pin. The bearing element 48a of the locking unit 30a is provided for mounting the activating element 36a so as to be pivotable on the cutting depth setting element 38a. The pivot axis 42a and the bearing element 48a of the locking unit 30a, when viewed along the movement axis 11a, are disposed within the housing unit 18a. The bearing element 48a of the locking unit 30a is configured from a metal. The bearing element 48a of the locking unit 30a is disposed within the bearing lug 44a of the activating element 36a. The bearing element 48a of the locking unit 30a is at least partially disposed within the lead through 45a delimited by the cutting depth setting element 38a. The bearing element 48a of the locking unit 30a, in particular on a side of the cutting depth setting element 38a that delimits the lead through 45a of the cutting depth setting element 38a, is connected in a rotationally fixed manner to the cutting depth setting element 38a. The cutting depth setting element 38a comprises a bearing lug 50a for mounting the activating element 36a and the cutting depth setting element 38a so as to be pivotable about an activation axis 37a of the cutting depth setting unit 28a on the housing unit 18a. The bearing lug 50a of the cutting depth setting element 38a is disposed so as to be separate from the activating element 36a. The activating element 36a is disposed on the cutting depth setting element 38a at an end region of the cutting depth setting element 38a that faces away from the bearing lug 50a of the cutting depth setting element 38a. The bearing lug 50a of the cutting depth setting element 38a is disposed in an end region of the cutting depth setting element 38a that is disposed within the housing unit 18a. The activation axis 37a is configured as a central axis of the bearing lug 50a of the cutting depth setting element 38a. The cutting depth setting element 38a delimits a further lead through 47a which, in particular when viewed along an axis of main extent of the cutting depth setting element 38a, is disposed between the bearing lug 50a of the cutting depth setting element 38a and the lead through 45a delimited by the cutting depth setting element 38a. The further lead through 47a which is delimited by the cutting depth setting element 38a is provided for mechanically connecting the cutting depth setting element 38a to the coupling element 39a.

The cutting depth setting element 38a delimits a recess 52a, wherein the activating element 36a is at least partially disposed within the recess 52a delimited by the cutting depth setting element 38a. The activating element 36a is at least largely disposed within the recess 52a delimited by the cutting depth setting element 38a. The bearing element 48a of the locking unit 30a is at least partially disposed in the recess 52a delimited by the cutting depth setting element 38a. The cutting depth setting element 38a at least largely encloses the activating element 36a and the bearing element 48a of the locking unit 30a. The pivot axis 42a runs at least partially through the recess 52a delimited by the cutting depth setting element 38a. The cutting depth setting element 38a is configured in such a manner that the recess 52a delimited by the cutting depth setting element 38a transversely to the operating direction 34a extends completely from one side of the cutting depth setting element 38a to a further side of the cutting depth setting element 38a that faces away from said side. The activating element 36a and the cutting depth setting element 38a are configured in such a manner that the cutting depth 20a, in particular by way of a movement of the activating element 36a in the unlocking direction 32a and a preferably subsequent movement of the cutting depth setting element 38a in the operating direction 34a can be set with one hand. The cutting depth setting element 38a comprises an activation face 54a and six activation appendages 56a which, in a position of the activating element 36a in an unlocked operating state of the locking unit 30a, are provided for operating the cutting depth setting element 38a with one hand, in particular with one finger. The activation face 54a and the activation appendages 56a of the cutting depth setting element 38a, when viewed transversely to the operating direction 34a, are disposed outside the recess 52a of the cutting depth setting element 38a. The activation face 54a and the activation appendages 56a of the cutting depth setting element 38a, when viewed transversely to the operating direction 34a, are disposed in a region of the cutting depth setting element 38a that borders the recess 52a delimited by the cutting depth setting element 38a. The activation appendages 56a on the cutting depth setting element 38a extend in each case along an axis of the cutting depth setting element 38a that is at least substantially perpendicular to the operating direction 34a. The activation face 54a and the activation appendages 56a are disposed on a side of the cutting depth setting element 38a that is disposed outside the housing unit 18a. The activating element 36a has at least one operating face 57a which is disposed so as to be at least substantially parallel to the activation axis 37a and/or to the pivot axis 42a. The operating face 57a, in particular in at least one pivoted position of the activating element 36a relative to the cutting depth setting element 38a, is disposed so as to be at least substantially parallel to the activation face 54a. The operating face 57a is at least partially disposed on a side 59a of the activating element 36a that, when viewed along the pivot axis 42a, has a minimum spacing from the pivot axis 42a which is equal to or larger than the activation face 54a of the cutting depth setting element 38a. The operating face 57a is disposed on a side 59a of the activating element 36a which is disposed outside the housing unit 18a.

The locking unit 30a has a restoring element 58a which by way of a restoring force is provided for holding the activating element 36a in a locked position, wherein the restoring element 58a is supported directly by way of the cutting depth setting element 38a of the cutting depth setting unit 28a. The restoring element 58a is configured as a spring element, in particular as a compression spring element. The restoring element 58a is configured and disposed in such a manner that the restoring force, at least substantially, acts, in particular automatically, counter to an activation force of a user that is exerted on the activating element 36a. The restoring element 58a is at least substantially completely disposed within the recess 52a delimited by the cutting depth setting element 38a.

Figure 3:
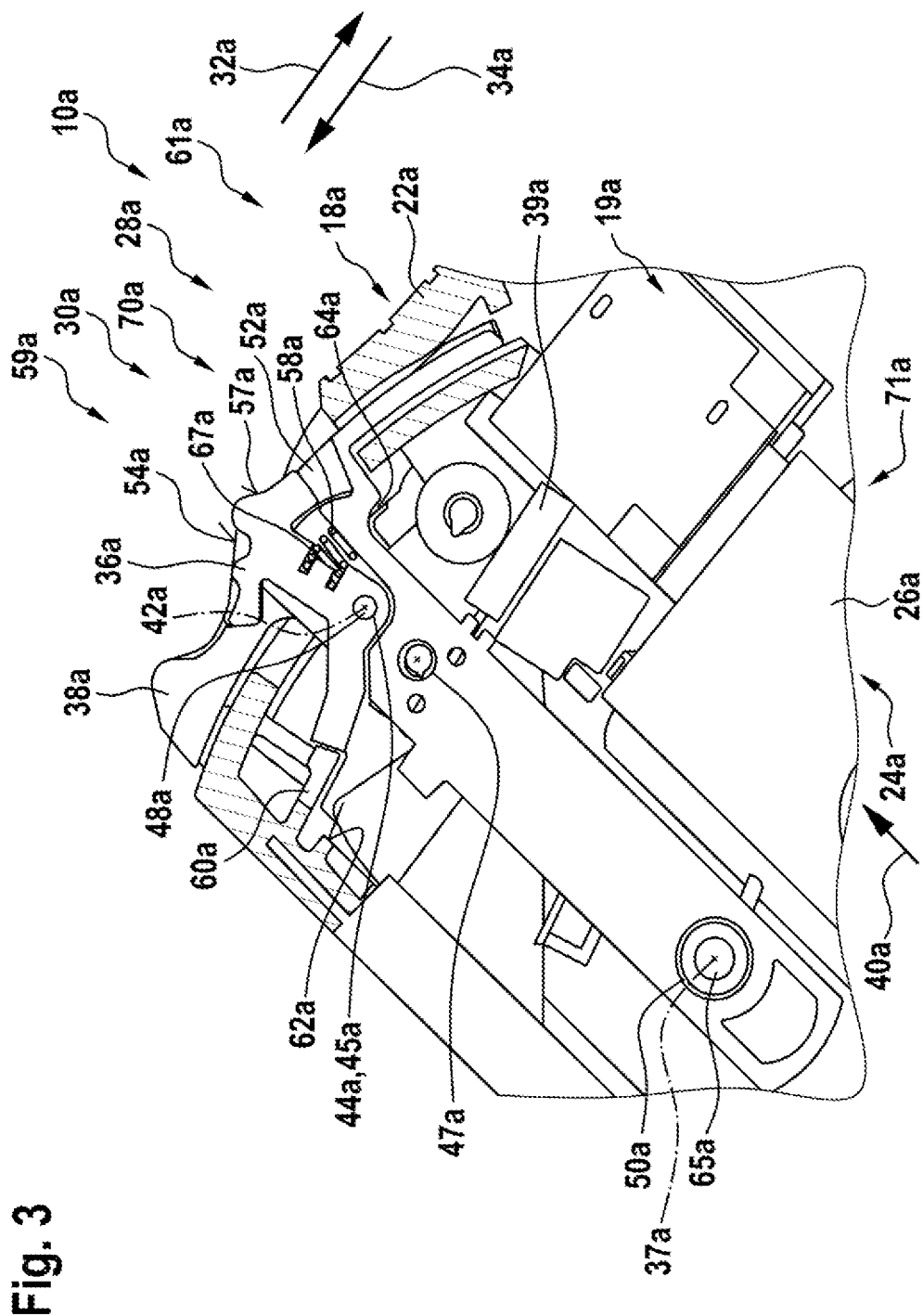
FIG. 3 shows a schematic sectional view through the power saw tool according to the disclosure in a region of the cutting depth setting unit and of the locking unit.

A section through the power saw tool 10a in a region of the cutting depth setting unit 28a and of the locking unit 30a is shown in FIG. 3. The cutting depth setting element 38a and the activating element 36a are at least largely enclosed by the housing unit 18a. The locking unit 30a has a form-fitting and/or force-fitting element 60a which is configured as a mechanical detent, wherein the activating element 36a for blocking and/or deactivating the cutting depth setting unit 28a in at least one operating state is provided for interacting with the form-fitting and/or force-fitting element 60a. The form-fitting and/or force-fitting element 60a is configured so as to be integral to the housing unit 18a of the power saw tool 10a. The form-fitting and/or force-fitting element 60a is disposed on an internal side 62a of the housing unit 18a. The activating element 36a and the cutting depth setting element 38a are configured from a plastics material, in particular a hard plastics material. The activating element 36a and the cutting depth setting element 38a are disposed in the region of proximity 61a of the operating element 26a of the operating unit 24a. However, other design embodiments of the cutting depth setting unit 28a, in particular of the cutting depth setting element 38a, and/or of the locking unit 30a, in particular of the activating element 36a, are also conceivable.

The housing unit 18a delimits a recess 64a into which the cutting depth setting element 38a can be moved when setting the cutting depth 20a. The housing unit 18a comprises a bearing element 65a which is configured as a bearing appendage and by way of which the activating element 36a, conjointly with the cutting depth setting element 38a, is mounted so as to be pivotable on the housing unit 18a. The bearing element 65a of the housing unit 18a is disposed in a rotationally fixed manner on the housing unit 18a and is configured so as to be integral to the housing unit 18a. The bearing element 65a of the housing unit 18a and the activation axis 37a extend, in particular between two internal walls of the housing unit 18a, so as to be at least substantially perpendicular to the movement plane and so as to be at least substantially parallel to the movement axis 11a. The bearing element 65a of the housing unit 18a extends from one face of the internal side of the housing unit 18a to a face of the internal side of the housing unit 18a that is opposite said face. The housing unit 18a delimits an opening 70a from the internal side 62a to an external side of the housing unit 18a, wherein the activating element 36a and the cutting depth setting element 38a are in particular at least partially disposed within the opening 70a. The housing unit 18a delimits a further opening 71a, wherein the operating element 26a is at least partially disposed within the further opening 71a.

The restoring element 58a is disposed between the activating element 36a and the cutting depth setting element 38a. The restoring element 58a by one end is supported on the cutting depth setting element 38a and by another end is supported on the activating element 36a. The restoring element 58a between the activating element 36a and the cutting depth setting element 38a extends so as to be at least substantially parallel to the operating direction 34a and/or to the unlocking direction 32a. The restoring element 58a is supported on a side of the activating element 36a that is at least partially disposed in the unlocking direction 32a. The restoring element 58a is configured and disposed in such a manner that the restoring force acts in a direction counter to the unlocking direction 32a. The restoring element 58a is at least largely enclosed by the cutting depth setting element 38a and the activating element 36a. The restoring element 58 by way of at least one end is fastened to the cutting depth setting element 38a. The restoring element 58a by way of another end is disposed so as to be guided within a recess 67a delimited by the activating element 36a. However, other design embodiments of the restoring element 58a, in particular as an elastomer, as a hydraulic element, as a pneumatic element or the like, or as a tension spring element, are also conceivable.

The tool receptacle 13a of the power saw tool 10a by way of the cutting depth setting unit 28a, in at least one non-activated operating state of the cutting depth setting element 38a, is fixed in at least one cutting depth position by way of the blocking element. The cutting depth setting unit 28a, in particular in an activation of the cutting depth setting element 38a by a user, by way of the coupling element 39a, in particular for setting the cutting depth 20a, is provided for releasing the tool receptacle 13a so as to move relative to the housing unit 18a of the power saw tool 10a. Other design embodiments of the coupling element 39a, in particular as an electronic component, are also conceivable.

The locking unit 30a is shown in the locked operating state in FIG. 3, wherein the activating element 36a bears on the form-fitting and/or force-fitting element 60a. The cutting depth setting element 38a in the unlocked operating state of the locking unit 30a is able to be moved in the operating direction 34a. The cutting depth setting element 38a in the locked operating state of the locking unit 30a is restricted in terms of a movement, in particular in the operating direction 34a, and/or is fixed in a position relative to the housing unit 18a. The locking unit 30a and the cutting depth setting unit 28a are configured in such a manner that setting of the cutting depth 20a takes place by way of a two-step method, wherein the activating element 36a for unlocking the cutting depth setting unit 28a is in particular moved relative to the cutting depth setting element 38a and, in particular subsequently, the activating element 36a and the cutting depth setting element 38a for setting the cutting depth 20a are conjointly moved around the axis of rotation 21a relative to the housing unit 18a. When the cutting depth setting element 38a is moved in the operating direction 34a, the coupling element 39a which is fastened to the further lead through 47a delimited by the cutting depth setting element 38a is preferably impinged with a force which is aligned so as to be at least substantially parallel to the operating direction 34a. The blocking element is preferably released on account of the force acting on the coupling element 39a, and setting of the cutting depth 20a is enabled.

Figure 4:
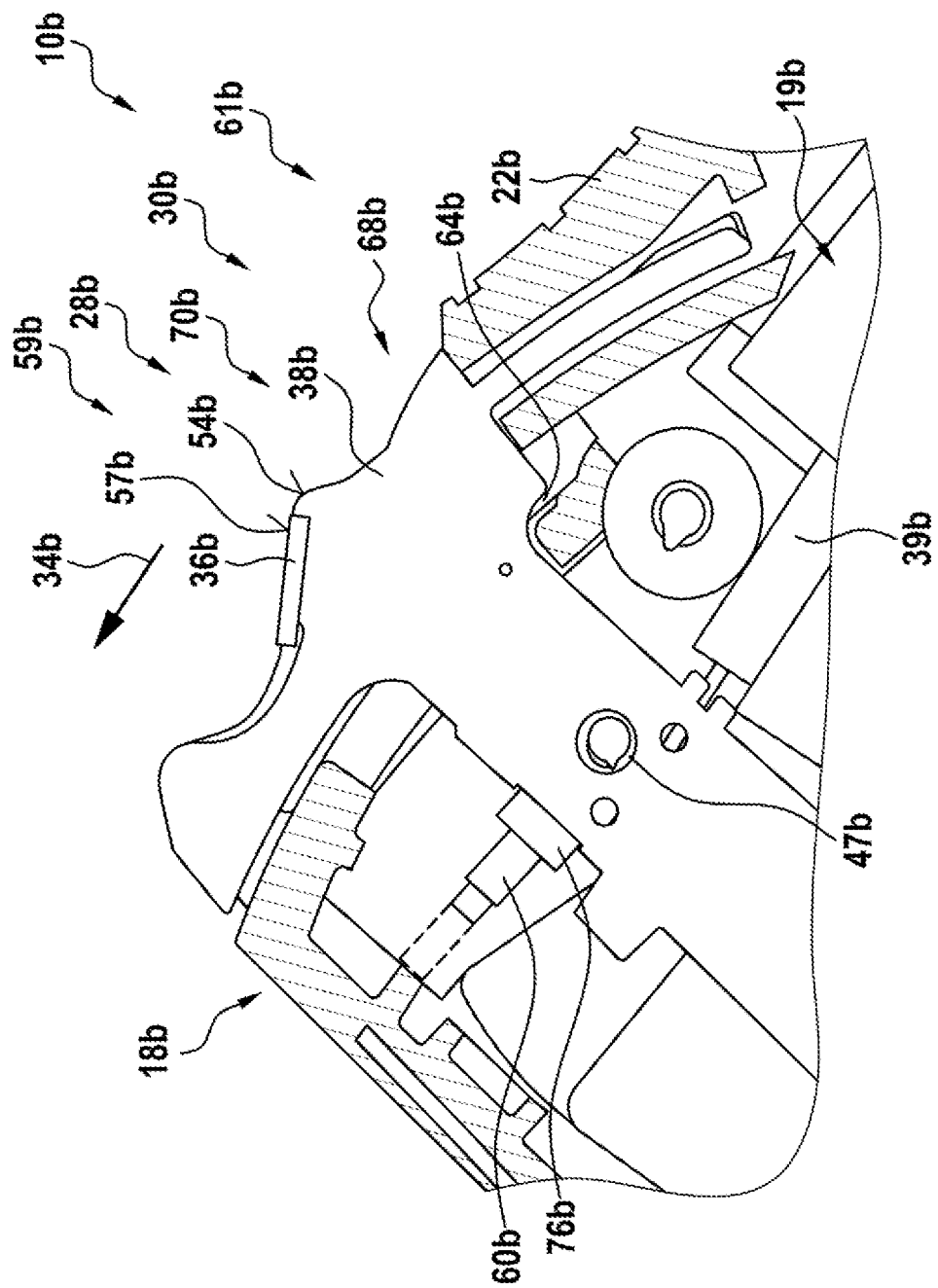
FIG. 4 shows a schematic sectional view through an alternative design embodiment of a power saw tool according to the disclosure in a region of a cutting depth setting unit and of a locking unit of the power saw tool, having an electronics unit of the locking unit.
Figure 5:
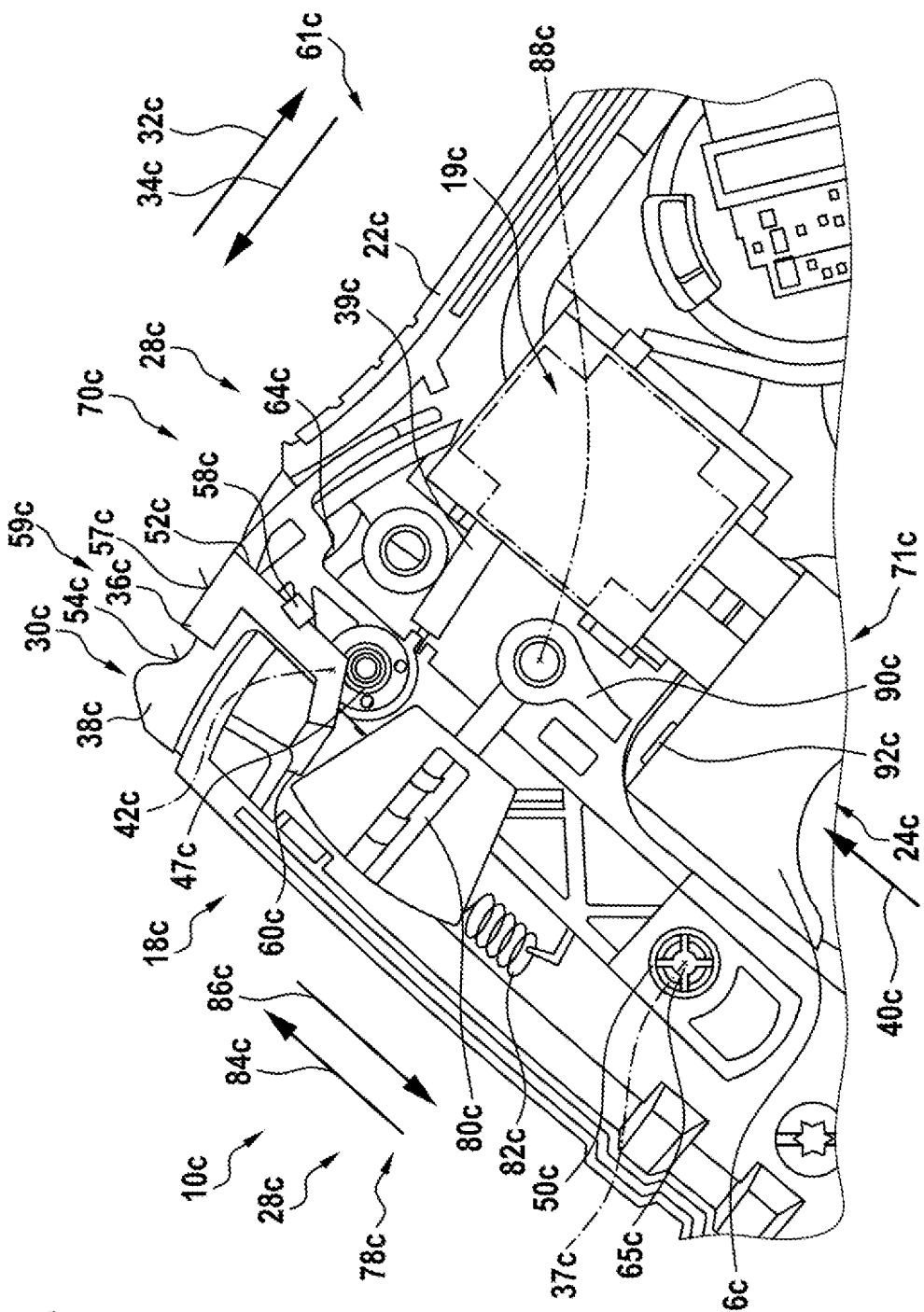
FIG. 5 shows a schematic sectional view through a further alternative design embodiment of a power saw tool according to the disclosure in a region of a cutting depth setting unit and of a locking unit of the power saw tool, having an on-switch blocking unit.

Two further exemplary embodiments of the disclosure are shown in FIGS. 4 and 5. The descriptions and the drawings hereunder are substantially limited to the differences between the exemplary embodiments, wherein reference in terms of identically referenced components, in particular in terms of components having identical reference signs, can in principle also be made to the drawings and/or the description of the other exemplary embodiments, in particular those of FIGS. 1 to 3. In order for the exemplary embodiments to be differentiated, the suffix a is added to the reference signs of the exemplary embodiment in FIGS. 1 to 3. The suffix a is replaced by the suffixes b and c in the exemplary embodiments of FIGS. 4 and 5.

A section through an alternative design embodiment of a power saw tool 10b configured as a hand-held circular saw is shown in FIG. 4 in a region of a cutting depth setting unit 28b which is provided for setting a cutting depth 20b (not shown in FIG. 4), and of a locking unit 30b of the power saw tool 10b that is provided for blocking and/or deactivating the cutting depth setting unit 28b in at least one operating state. The locking unit 30b is mounted so as to be at least partially movable on the cutting depth setting unit 28b. The power saw tool 10b illustrated in FIG. 4 has a design embodiment which is at least substantially analogous to that of the power saw tool 10a described in the description of FIGS. 1 to 3, such that, in terms of a design embodiment of the power saw tool 10b illustrated in FIG. 4, reference can at least substantially be made to the description of FIGS. 1 to 3. As opposed to the power saw tool 10a described in the description of FIGS. 1 to 3, the locking unit 30b of the power saw tool 10b illustrated in FIG. 4 preferably has an electronics unit 68b. The electronics unit 68b in an activation by a user, is provided for releasing and/or activating the cutting depth setting unit 28b, in particular by way of an electric and/or electronic signal. The electronics unit 68b is configured as a part of an electronics system 19b of the power saw tool 10b. The locking unit 30b is configured in such a manner that unlocking of the cutting depth setting unit 28b by way of the locking unit 30b, in particular independently of any impingement with a force by a user, takes place by way of a fingerprint scan. The locking unit 30b comprises an activating element 36b which is configured as a part of the electronics unit 68b. The activating element 36b is configured as a fingerprint sensor. The activating element 36b is disposed on a cutting depth setting element 38b of the cutting depth setting unit 28b.

The electronics unit 68b comprises an actuator 76b which is configured as a linear motor and which, in particular for unlocking the cutting depth setting unit 28b, is provided for moving at least one form-fitting and/or force-fitting element 60b of the locking unit 30b relative to the cutting depth setting unit 28b, in particular the cutting depth setting element 38b. The form-fitting and/or force-fitting element 60b is mounted so as to be movable on the cutting depth setting unit 28b, in particular the cutting depth setting element 38b. The form-fitting and/or force-fitting element 60b, in particular by way of the actuator 76b, is activatable and/or able to be activated by way of the electric and/or electronic signal. The form-fitting and/or force-fitting element 60b in at least one deactivated operating state of the electronics unit 68b, is provided for blocking and/or for deactivating the cutting depth setting unit 28b, in particular the cutting depth setting element 38b, in particular by way of a form-fitting and/or force-fitting connection to a housing unit 18b of the power saw tool 10b. The form-fitting and/or force-fitting element 60b and the actuator 76b are at least substantially completely disposed within the housing unit 18b. The activating element 36b, the actuator 76b, and the electronics system 19b are conductively connected to one another. The locking unit 30b is shown in an unlocked operating state in FIG. 4, wherein the form-fitting and/or force-fitting element 60b is in particular disposed so as to be spaced apart from the housing unit 18b. The form-fitting and/or force-fitting element 60b, in a transition to a locked operating state of the locking unit 30b, is in particular provided for being moved relative to the cutting depth setting element 38b by means of the actuator 76b, wherein the form-fitting and/or force-fitting element 60b for blocking and/or deactivating the cutting depth setting unit 28b is brought in contact with the housing unit 18b. However, other design embodiments of the electronics unit 68b are also conceivable.

A section through a further alternative design embodiment of a power saw tool 10c configured as a hand-held circular saw is shown in FIG. 5 in a region of a cutting depth setting unit 28c which is provided for setting a cutting depth 20c (not shown in FIG. 5), and of a locking unit 30c of the power saw tool 10c that is provided for blocking and/or for deactivating the cutting depth setting unit 28c in at least one operating state. The locking unit 30c is mounted so as to be at least partially movable on the cutting depth setting unit 28c. The power saw tool 10c illustrated in FIG. 5 has a design embodiment which is at least substantially analogous to that of the power saw tool 10a described in the description of FIGS. 1 to 3, such that, in terms of a design embodiment of the power saw tool 10c illustrated in FIG. 4, reference can at least substantially be made to the description of FIGS. 1 to 3. As opposed to the power saw tool 10a described in the description of FIGS. 1 to 3, the power saw tool 10c has an on-switch blocking unit 78c, which is provided for at least temporarily blocking an activation of an operating element 26c of an operating unit 24c of the power saw tool 10c. The on-switch blocking unit 78c has an unblocking element 80c for releasing the operating element 26c. The unblocking element 80c by way of a spring 82c is configured so as to be spring-loaded, wherein the unblocking element 80c is impinged with a restoring force which is aligned in the direction 84c of a blocked position of the unblocking element 80c, in particular relative to a housing unit 18c of the power saw tool 10c. The unblocking element 80c for activating the operating element 26c is provided for being moved by a user to an unblocked position, in particular relative to the housing unit 18c, in particular for being held continuously in the blocked position. The unblocking element 80c is mounted on the housing unit 18c so as to be rotatable about a rotation axis 88c of the unblocking element 80c. The unblocking element 80 in one region is configured as a mechanical detent 90c which in the blocked position interacts with an appendage 92c of the operating element 26c, in particular so as to block the operating element 26c. The unblocking element 80c is disposed on the housing unit 18c in a region of proximity 61c of the operating element 26c. The unblocking element 80c has at least one unblocking direction 86c in which the unblocking element 80c is able to be moved, in particular to the unblocked position, for releasing the operating element 26c. The on-switch blocking unit 78c, in particular the unblocking element 80c, is configured in such a manner that the unblocking direction 86c is aligned so as to be at least substantially perpendicular to an operating direction 34c of a cutting depth setting element 38c of the cutting depth setting unit 28c. However, other design embodiments of the on-switch blocking unit 78c are also conceivable, wherein the unblocking element 80c for blocking the operating element 26c is in particular configured so as to be coupled to the locking unit 30*c* and/or the cutting depth setting unit 28*c*.

What is claimed is:

1. A power saw tool, comprising:
at least one cutting depth setting unit configured to set a cutting depth by movement of a tool receptacle about a first axis; at least one locking unit configured to block and/or deactivate the cutting depth setting unit in at least one operating state, the locking unit mounted so as to be at least partially movable on the cutting depth setting unit and movable with the cutting depth setting unit about a second axis substantially parallel to the first axis and offset from the first axis;
wherein the at least one locking unit has at least one activating element and the at least one cutting depth setting unit has at least one cutting depth setting element, and wherein the at least one activating element is mounted on the at least one cutting depth setting element so as to be movable on the at least one cutting depth setting element; and
wherein the at least one activating element is mounted so as to be pivotable on the at least one cutting depth setting element about a third axis substantially parallel to the first axis and the second axis and offset from the first axis and the second axis.

2. The power saw tool according to claim 1, further comprising at least one housing unit that at least partially encloses the at least one locking unit and the at least one cutting depth setting unit, wherein the at least one activating element conjointly with the at least one cutting depth setting element is mounted so as to be pivotable on the at least one housing unit.

3. The power saw tool according to claim 1, further comprising at least one operating unit configured to control a machine function, wherein the at least one activating element and the at least one cutting depth setting element are disposed in a region of proximity of at least one operating element of the at least one operating unit.

4. The power saw tool according to claim 3, wherein the at least one operating unit is configured to control the machine function of a motor.

5. The power saw tool according to claim 1, wherein the at least one cutting depth setting unit comprises at least one cutting depth setting element, and the at least one locking unit comprises at least one activating element, wherein the at least one cutting depth setting element delimits at least one recess, and wherein the at least one activating element is at least partially disposed within the at least one recess.

6. The power saw tool according to claim 1, wherein the at least one locking unit is configured to unlock the at least one cutting depth setting unit and has at least one unlocking direction that is at least substantially directed counter to an operating direction of the at least one cutting depth setting unit.

7. The power saw tool according to claim 1, wherein the at least one locking unit has at least one activating element and at least one restoring element that by way of a restoring force is configured to hold the at least one activating element in a locked position, and
wherein the at least one restoring element is at least partially supported by way of a cutting depth setting element of the at least one cutting depth setting unit.

8. The power saw tool according to claim 7, wherein the at least one restoring element is directly supported by way of the cutting depth setting element.

9. The power saw tool according to claim 1, further comprising at least one housing unit, the at least one locking unit and the at least one cutting depth setting unit at least partially disposed on a side of the at least one housing unit that faces away from an operating element and a machining region of the power saw tool.

10. The power saw tool according to claim 9, wherein the at least one locking unit and the at least one cutting depth setting unit are at least partially disposed on a handle element of the at least one housing unit that faces away from the at least one operating element and the machining region of the power saw tool.

11. The power saw tool according to claim 1, wherein the at least one locking unit comprises at least one electronics unit that, when activated by a user, is configured to one or more of release and activate the at least one cutting depth setting unit.

12. The power saw tool according to claim 11, wherein the one or more of the release and the activation of the at least one cutting depth setting unit by the at least one electronic unit is by way of one or more of an electric signal and an electronic signal.

13. The power saw tool according to claim 1, wherein the power saw tool is configured as a hand-held circular saw.

14. The power saw tool according to claim 1, wherein the at least one activating element is mounted so as to be movable in the at least one cutting depth setting element.

* * * * *